United States Patent
Ganev et al.

(10) Patent No.: US 7,019,415 B2
(45) Date of Patent: Mar. 28, 2006

(54) ELECTRICAL POWER GENERATION SYSTEM AND METHOD FOR MITIGATING CORONA DISCHARGE

(75) Inventors: Evgeni Ganev, Torrance, CA (US); Mike S. Koerner, Rancho Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 139 days.

(21) Appl. No.: 10/805,767

(22) Filed: Mar. 22, 2004

(65) Prior Publication Data

US 2005/0206166 A1    Sep. 22, 2005

(51) Int. Cl.
*H02P 9/04* (2006.01)

(52) U.S. Cl. .............................. 290/52; 290/1 A; 290/2; 310/59; 60/516

(58) Field of Classification Search .............. 290/1 A, 290/2, 4 R, 52; 310/59, 61; 60/516
See application file for complete search history.

(56) References Cited

U.S. PATENT DOCUMENTS

| | | | |
|---|---|---|---|
| 4,207,485 A | 6/1980 | Silver | |
| 4,362,020 A * | 12/1982 | Meacher et al. | 60/657 |
| 5,455,470 A | 10/1995 | Denk et al. | |
| 5,519,274 A | 5/1996 | Scharrer | |
| 5,801,464 A | 9/1998 | Brezoczky | |
| 5,818,117 A * | 10/1998 | Voss et al. | 290/40 A |
| 6,135,640 A | 10/2000 | Nadjafi | |
| 6,246,138 B1 | 6/2001 | Nims | |
| 6,269,639 B1 * | 8/2001 | Conrad | 60/520 |
| 6,316,841 B1 * | 11/2001 | Weber | 290/4 R |
| 6,353,273 B1 | 3/2002 | Heshmat et al. | |
| 6,373,156 B1 | 4/2002 | Suzuki et al. | |
| 6,469,411 B1 | 10/2002 | Lembke | |
| 6,470,679 B1 * | 10/2002 | Ertle | 60/512 |
| 6,483,215 B1 | 11/2002 | Bodmer et al. | |
| 6,580,179 B1 * | 6/2003 | Eccles et al. | 290/44 |
| 6,668,539 B1 | 12/2003 | Schlote | |
| 6,668,542 B1 * | 12/2003 | Baker et al. | 60/247 |
| 6,903,470 B1 * | 6/2005 | Doherty et al. | 310/59 |
| 6,951,111 B1 * | 10/2005 | Chen | 60/775 |
| 2002/0050719 A1 | 5/2002 | Caddell et al. | |
| 2002/0079765 A1 | 6/2002 | Lemke | |
| 2002/0089245 A1 | 7/2002 | Chen et al. | |

* cited by examiner

*Primary Examiner*—Nicholas Ponomarenko
(74) *Attorney, Agent, or Firm*—Oral Caglar, Esq.

(57) ABSTRACT

A power generation system including a housing defining a cavity and having an inlet for receiving a fluid that is used to cool and pressurize the cavity and an outlet for removing the fluid from the cavity. The system also may include a rotor having a first end positioned within the cavity of the housing and a second end, a plurality of bearings, positioned to contact the rotor, for providing radial support to the rotor, and a turbine connected to the second end of the rotor. Further, the system may include a heat sink positioned within the cavity and between the housing and the rotor, an electronic component attached to the heat sink, and a reaction chamber for receiving the fluid from the outlet and for producing a substance that is directed to the turbine causing it to rotate.

20 Claims, 5 Drawing Sheets

ELECTRICAL POWER GENERATION SYSTEM AND METHOD FOR MITIGATING CORONA DISCHARGE

BACKGROUND OF THE INVENTION

1. Field of the Invention

The invention relates generally to power generation systems for space applications such as re-useable launch vehicles, and more particularly to an electrical power generation system and method for mitigating corona discharge.

2. Description of the Related Art

Reusable space vehicles use power generation systems for providing power during launch and recovery. For example, the space shuttle uses hydrazine-fueled, turbine-driven, gearbox-mounted hydraulic pumps to provide power for thrust-vector and flight control actuation. Alternative electric power generation systems operate at high voltages in order to minimize their size and weight. During ascent and re-entry, these space vehicles are exposed to low ambient pressures.

These systems, however, have several drawbacks. For example, these systems are very costly, complex and require many auxiliary systems, such as oil lubrication systems, to operate. In addition, these systems are dangerous to operate due to the need to handle highly toxic propellants such as hydrazine. Furthermore, these systems emit damaging corona discharge during ascent and re-entry.

Thus, it should be appreciated that there is a need for a high-power electrical power generation system that does not use an oil lubrication system, use toxic propellants and emit corona discharge. The invention fulfills this need as well as others.

SUMMARY OF THE INVENTION

The invention relates to systems and methods for mitigating corona discharge. In particular, and by way of example only, one embodiment of the invention is a power generation system including a housing defining a cavity and having an inlet for receiving a fluid that is used to cool and pressurize the cavity and an outlet for removing the fluid from the cavity. The system also may include a rotor having a first end positioned within the cavity of the housing and a second end, a plurality of bearings positioned to provide radial support to the rotor, and a turbine connected to the second end of the rotor. Further, the system may include a heat sink positioned within the cavity and between the housing and the rotor, an electrical device (e.g., an electronic component) attached to the heat sink, and a reaction chamber for receiving the fluid from the outlet and for producing a substance that is directed to the turbine causing it to rotate.

One embodiment of the invention is an electrical power generation system including an outer housing defining a chamber. The outer housing includes an input conduit for receiving a fluid that is used to cool and pressurize the chamber and an output conduit for removing the fluid from the chamber. The system also includes a turbine positioned adjacent to the outer housing, a rotor positioned within the chamber and connected to the turbine for rotating about a central axis, and an inner housing positioned within the chamber and between the outer housing and the rotor. Further, the system includes a plurality of electronic components attached to the inner housing and cooled by the fluid, a stator attached to the inner housing and adjacent to the rotor, a plurality of bearings, positioned adjacent to the stator, for providing radial support to the rotor and cooled by the fluid, and a reaction chamber for receiving the fluid from the output conduit and producing a material that is directed to the turbine causing it to rotate.

One embodiment of the invention is a method for mitigating corona discharge including introducing a fluid into a cavity defined by an outer housing, the fluid being used to pressurize the cavity and to cool a rotor, a stator, a plurality of bearings and a plurality of electrical components. The method also includes removing the fluid from the cavity, and directing the fluid into a reaction chamber that produces a material used to cause a turbine that is attached to the rotor to rotate.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Systems and methods that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
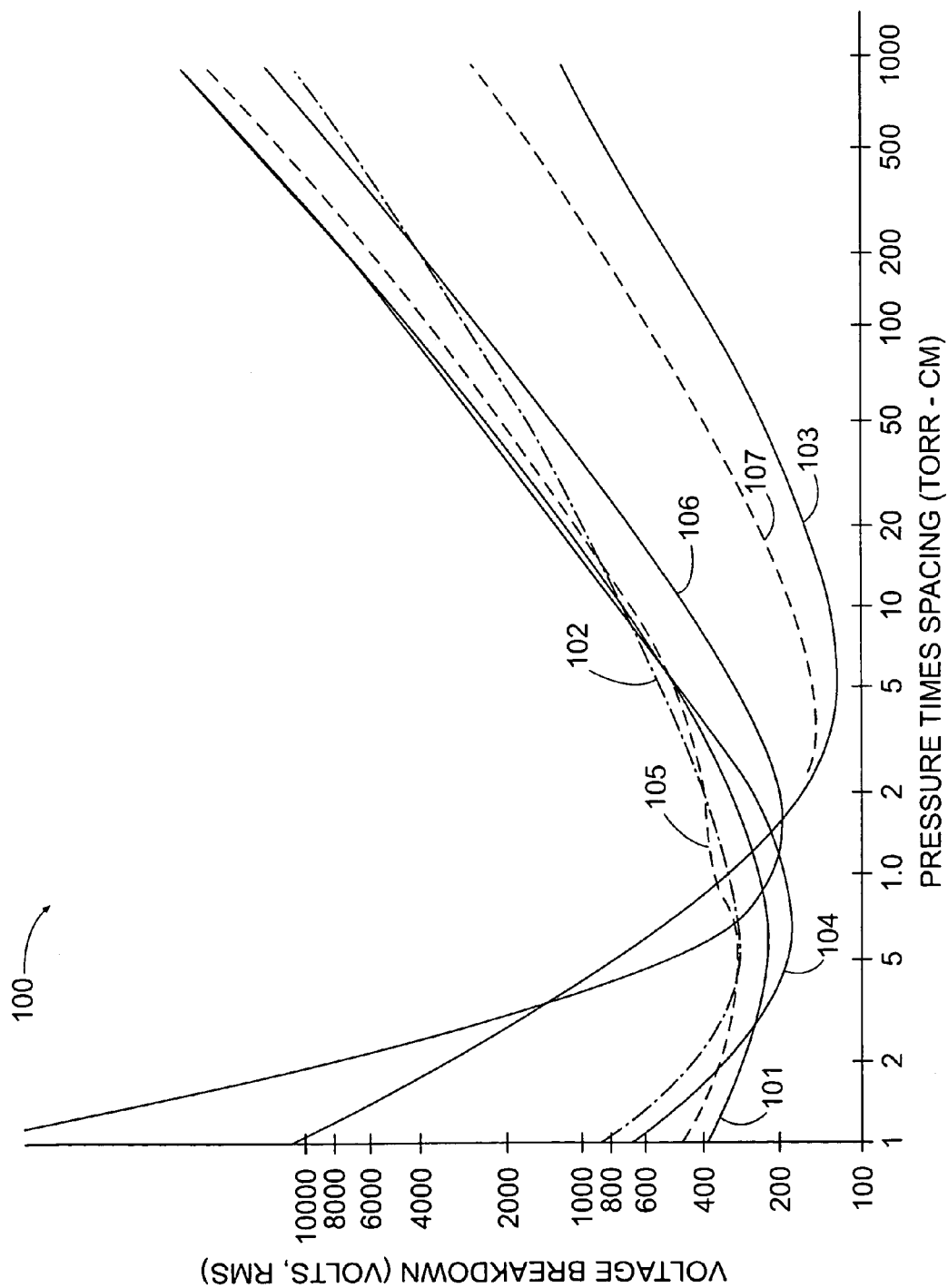
FIG. 1 is a graph showing Paschen curves for air, carbon dioxide, helium, nitrogen, oxygen, hydrogen and neon gases at room temperature.

Referring now more particularly to the drawings, FIG. 1 is a graph 100 showing Paschen curves 101–107 for air, carbon dioxide, helium, nitrogen, oxygen, hydrogen and neon gases at room temperature. The Paschen curves 101–107 identify the breakdown voltages between parallel plates of the various gases shown in FIG. 1. In particular, these Paschen curves 101–107 show the breakdown voltage of the gas (y-axis) as a function of the gas pressure times the spacing of the gap (x-axis), for example, between the parallel plates. The gap is generally measured to be the distance between the parallel plates across which the voltage is applied. The gap represents the maximum open distance parallel to an applied electric field. A characteristic of the Paschen curves 101–107 is that the breakdown voltage of the device is increased at any pressure by increasing the spacing of the gap. That is, in a fixed electric field, the breakdown voltage across the gap becomes smaller as the gap becomes smaller, and according to the Paschen curves 101–107, this increases the breakdown voltage of the device. In the illustrated embodiment, hydrogen and oxygen gases are used as the coolants, lubricants and propellants for the electrical power generation system. However, one skilled in the art will be able to implement the invention using other gases including, but not limited to, the gases shown in FIG. 1.

Figure 2A:
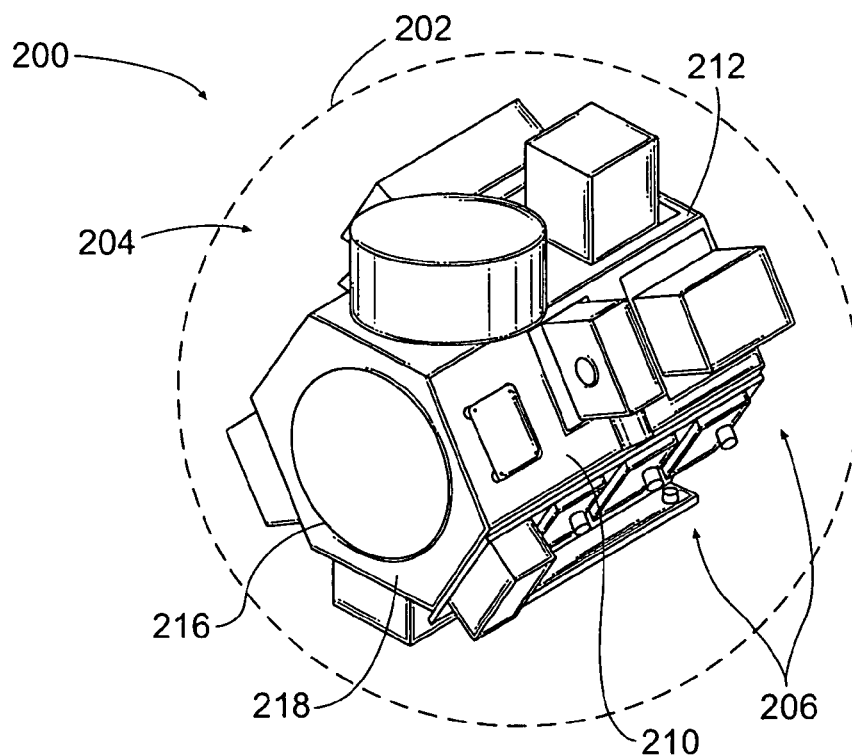
FIGS. 2A, 2B are perspective views of an electrical power generation system with its outer housing removed so that the components and electronics within the outer housing can be viewed according to an embodiment of the invention.
Figure 2B:
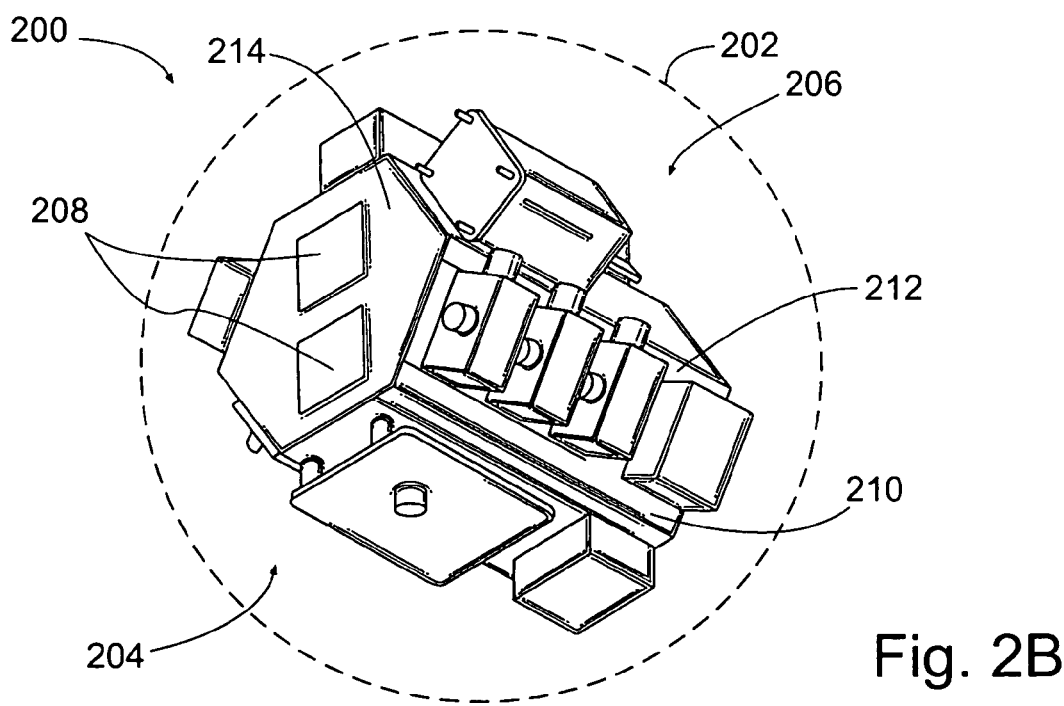

FIGS. 2A, 2B are perspective views of an electrical power generation system 200 with its outer housing 202 removed so that the components and electronics within the outer housing 202 can be viewed. The electrical power generation system 200 is typically a 270-volt dc electric power generation system used in space applications where a hydrogen gas is used as the turbine fuel. The outer housing 202 has a substantially air-tight chamber 204 for housing the components and electronics that make up the electrical power generation system 200. The outer housing 202 may be made of an aluminum, steel, titanium or other metallic material and is used to protect the components and high-voltage electronics (e.g., power electronics 206 and signal electronics 208) from external factors. The power electronics 206 are typically mounted on an outer surface 210 of a cold plate 212 (can also be referred to as an inner housing), the signal electronics 208 are typically mounted on a first side surface 214 of the outer housing 202 and a turbine wheel 216 is typically positioned adjacent to a second side surface 218 of the outer housing 202. The first side surface 214 is generally positioned opposite the second side surface 218.

The components are generally contained within the outer housing 202 and the power electronics 206 are generally mounted to the cold plate 212. In one embodiment, the components and the electronics are housed within the outer housing 202. The cold plate 212 may be made of an aluminum, steel, titanium or other metallic material and functions and serves as a common heat exchanger or heat sink. In the illustrated embodiment, the power electronics 206 are mounted around a hexagonal shaped cold plate 212 and the signal electronics 208 are mounted on the first side surface 214 of the outer housing 202.

Figure 3:
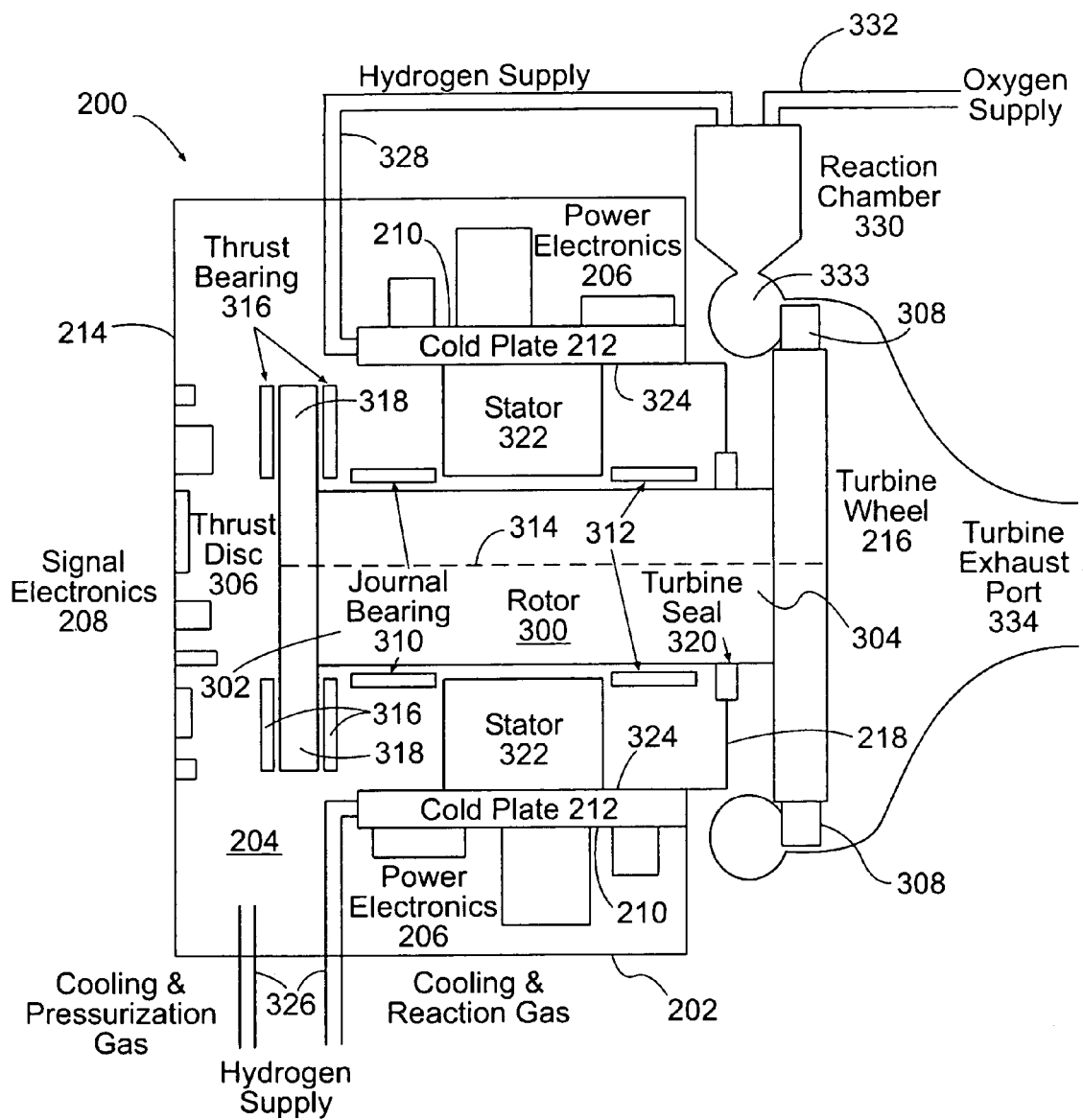
FIG. 3 is a cross-sectional view illustrating the physical layout of the components and electronics of the electrical power generation system of FIGS. 2A, 2B according to an embodiment of the invention.

FIG. 3 is a cross-sectional view illustrating the physical layout of the components and electronics of the electrical power generation system 200 of FIGS. 2A, 2B. The electrical power generation system 200 includes a rotor 300 that may be cylindrical in shape and that has a first end 302 and a second end 304, a thrust disc 306 that is connected to the first end 302 of the rotor 300, the turbine wheel 216 that is connected to the second end 304 of the rotor 300 and a set of turbine blades 308 that are attached about the circumference of the turbine wheel 216. The electrical power generation system 200 further includes a first set of journal bearings 310 that are circumferentially positioned around the first end 302 of the rotor 300 and a second set of journal bearings 312 that are circumferentially positioned around the second end 304 of the rotor 300. The first and second sets of journal bearings 312 provide radial support to the rotor 300. The rotor 300 is mounted or rotates on the first and second sets of journal bearings 310, 312. The first and second sets of journal bearings 310, 312 are used to assist the rotor 300 in rotating concentrically about a central axis 314. In one embodiment, the first and second sets of journal bearings 310, 312 are radially spaced from the central axis 314. The turbine wheel 216 is mounted in a fixed orientation, without any gears, to the rotor 300. In one embodiment, the turbine wheel 216 may be an axial-impulse turbine wheel or any other type of turbine wheel.

The electrical power generation system 200 also includes a plurality of thrust bearings 316 that are circumferentially positioned around an outer portion 318 of the thrust disc 306 to provide axial support to the rotor 300. The thrust disc 306 is mounted or rotates on the plurality of thrust bearings 316. The plurality of thrust bearings 316 are radially spaced around the central axis 314 and are used to maintain the rotor axial position. The rotor 300, the thrust disc 306, the turbine wheel 216, and the turbine blades 308 are configured to rotate about the central axis 314 at substantially the same revolutions per minute. In one embodiment, the first and second sets of journal bearings 310, 312 and the plurality of thrust bearings 316 are self-acting, hydrodynamic foil bearings. Hence, the rotor 300 and the thrust disc 306 may be mounted on foil bearings. When foil bearings are used, no oil lubrication for the bearings is required. Other types of bearings such as externally pressurized hydrostatic bearings, gas cooled ceramic ball bearings, magnetic bearings with a pressurized cooling fluid or any other types of bearings can be used.

A ring-shaped turbine seal 320 is positioned around the second end 304 of the rotor 300 to provide a substantially air tight seal between the rotor 300 and the housing 202. The ring-shaped turbine seal 320 provides a seal so that the gas inside the chamber 204 is maintained within the chamber 204. The ring-shaped turbine seal 320 may be a floating ring seal or similar device.

The electrical power generation system 200 also includes a stator 322 attached to an inner surface 324 of the cold plate 212. The stator 322 is positioned around the rotor 300 and between the first and second sets of journal bearings 310, 312. The stator 322 is mounted in a stationary position relative to the cold plate 212.

As shown in FIG. 3, the power electronics 206, the signal electronics 208, the cold plate 212, the rotor 300, the thrust disc 306, the first and second sets of journal bearings 310, 312, the plurality of thrust bearings 316 and the stator 322 are contained within or housed inside the outer housing 202. The outer housing 202 includes one or more inlets or input conduits 326 for allowing a fluid to enter the chamber 204 and one or more outlets or output conduits 328 for allowing the fluid to exit the chamber 204 and directing the fluid to a reaction chamber 330. In one embodiment, a first conduit 326a is positioned to direct the fluid into the chamber 204 to cool and pressurize the chamber 204 and the power electronics 206 and a second conduit 326b is positioned to direct the fluid toward or into the cold plate 212 to cool the cold plate 212. Cooling the cold plate 212 also cools the power electronics 206 and the stator 322, which are attached to the cold plate 212. The output conduit 328 allows the fluid to be removed from the chamber 204 and the cold plate 212 and directs the fluid into the reaction chamber 330 where it may be combined with another fluid. The input conduit 326 is generally located at one end of the outer housing 202 and the output conduit 328 is generally located at an opposite end of the outer housing 202 to ensure that the fluid travels throughout the chamber 204 to cool all the components within the chamber 204. In one embodiment, the fluid is constantly fed into the input conduit 326, travels through the chamber 204 to cool and pressurize the components, the power electronics 206 and the signal electronics 208 within the chamber 204, and travels through the output conduit 328 to the reaction chamber 330. The pressure within outer housing 202 is maintained at a substantially constant pressure value by metering the flow of fluid into the chamber 204 via the input conduit 326.

The fluid may be a gas such as a hydrogen gas, helium gas, nitrogen gas or oxygen gas; a liquid such as alcohol, liquid rocket propellant, liquid hydrogen, liquid nitrogen or liquid oxygen; or combinations thereof. The fluid can be used as a bearing process fluid to lubricate the first and second sets of journal bearings 310, 312 and the plurality of thrust bearings 316, a cooling fluid to cool the components (e.g., the cold plate 212, the rotor 300, the thrust disc 306, the first and second sets of journal bearings 310, 312, the plurality of thrust bearings 316 and the stator 322) and the high-voltage electronics contained within the housing 202, and a pressurizing fluid to pressurize the chamber 204, which in turn pressurizes the high-voltage electronics. Hence, the same fluid is advantageously used as a lubricant, coolant, pressurizer and fuel for the electrical power generation system 200. Therefore, separate fluids are not required for each of these different purposes.

Locating the power electronics 206 and the signal electronics 208 within the chamber 204 advantageously allows the fluid to be used to cool and pressurize the components and electronics while also allowing the fluid to be used as a propellant (i.e., fuel) and/or reactant for the reaction chamber 330. An additional advantage includes providing corona mitigation with little to no additional complexity and cost and thus virtually eliminating the need for more complex systems or methods of corona mitigation. Furthermore, the electrical power generation system 200 does not require a separate cooling system, housing or pressure vessel or pressurization system for the power electronics 206.

The electrical power generation system 200 may include a supply conduit 332 for supplying a second fluid into the reaction chamber 330. The second fluid may be one which is capable of being chemically reacted with the first fluid. For example, if the first fluid is a hydrogen gas, the second fluid might be an oxygen gas. The reaction chamber 330 causes a combustion reaction of the fluid (e.g., a hydrogen gas) and the second fluid (e.g., an oxygen gas) to create a mixture (e.g., a hydrogen-oxygen mixture) producing combustion reaction products, which may include at least a part of thrust matter. Other propellant combinations can be used to produce combustion reaction products. The combustion reaction products are discharged through a discharge port 333 of the reaction chamber 330 to a turbine exhaust port 334 causing the turbine blades 308 and the turbine wheel 216 to rotate about the central axis 314. Hence, the combustion reaction products are used as the propellant for the turbine wheel 216. The rotation of the turbine wheel 216 generates power for the electrical power generation system 200.

Figure 4:
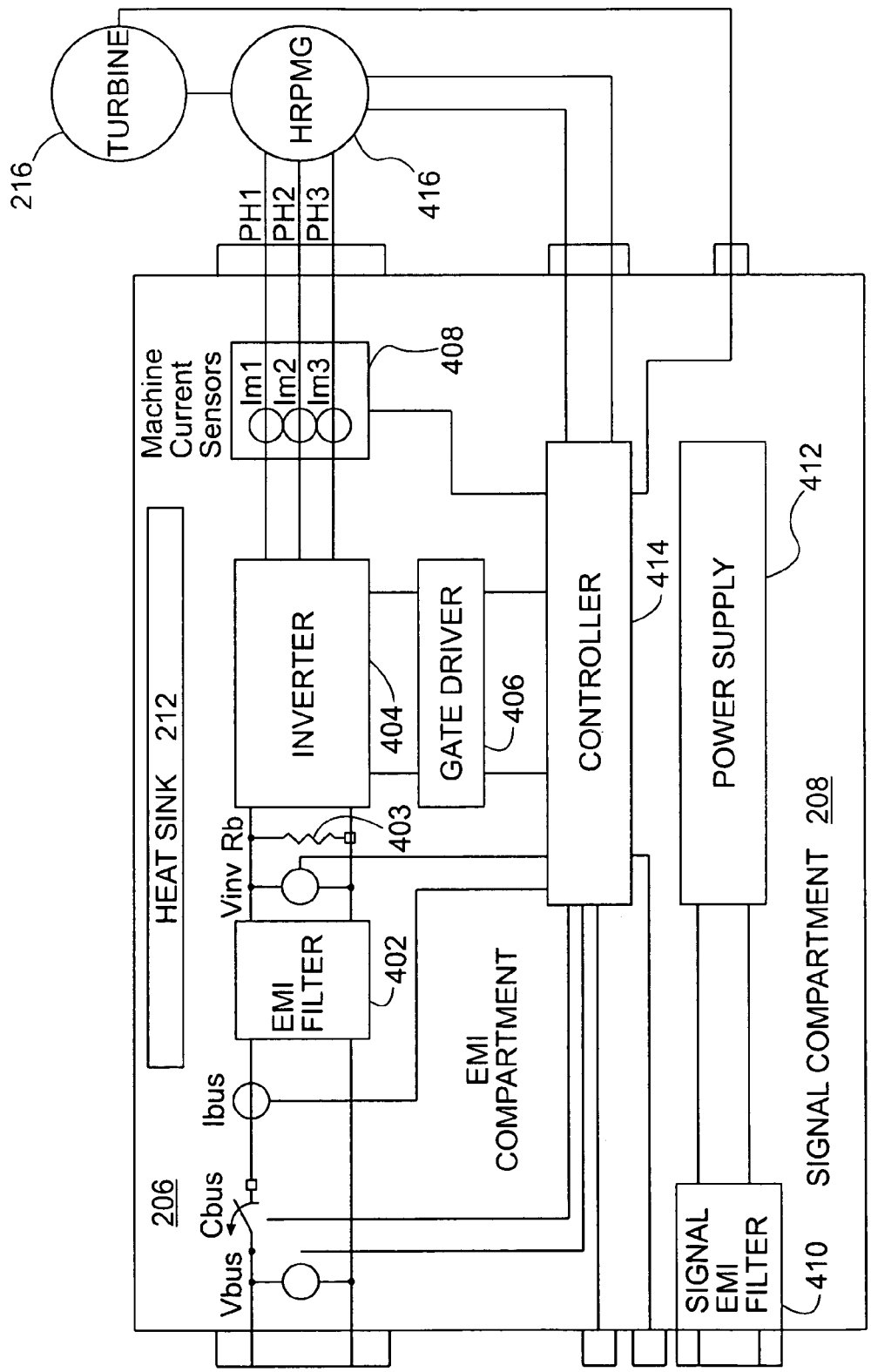
FIG. 4 is a block diagram illustrating an electrical system architecture of the power electronics and the signal electronics of the electrical power generation system of FIGS. 2A, 2B according to an embodiment of the invention.

FIG. 4 is a block diagram illustrating an electrical system architecture of the power electronics 206 and the signal electronics 208 of the electrical power generation system 200 of FIGS. 2A, 2B. The power electronics 206 may include an electromagnetic interference (EMI) filter 402, a bleed resistor 403, an inverter 404, a gate driver 406 and current sensors 408. The signal electronics 208 may include a signal EMI filter 410, a power supply 412 and a controller 414 (e.g., a digital or analog controller). The power electronics 206 and the signal electronics 208 may be referred to as electrical components. The combination of the rotor 300 and the stator 322 can be referred to as a high-reactance permanent-magnet generator (HRPMG) 416. The power electronics 206 and the signal electronics 208 are mounted to the outer housing 202 and are located within the chamber 204. The current sensors 408 measure the current between the power electronics 206 and the HRPMG 416. One skilled in the art will be able to make the electrical power generation system 200 using the electrical schematic shown in FIG. 4.

Figure 5:
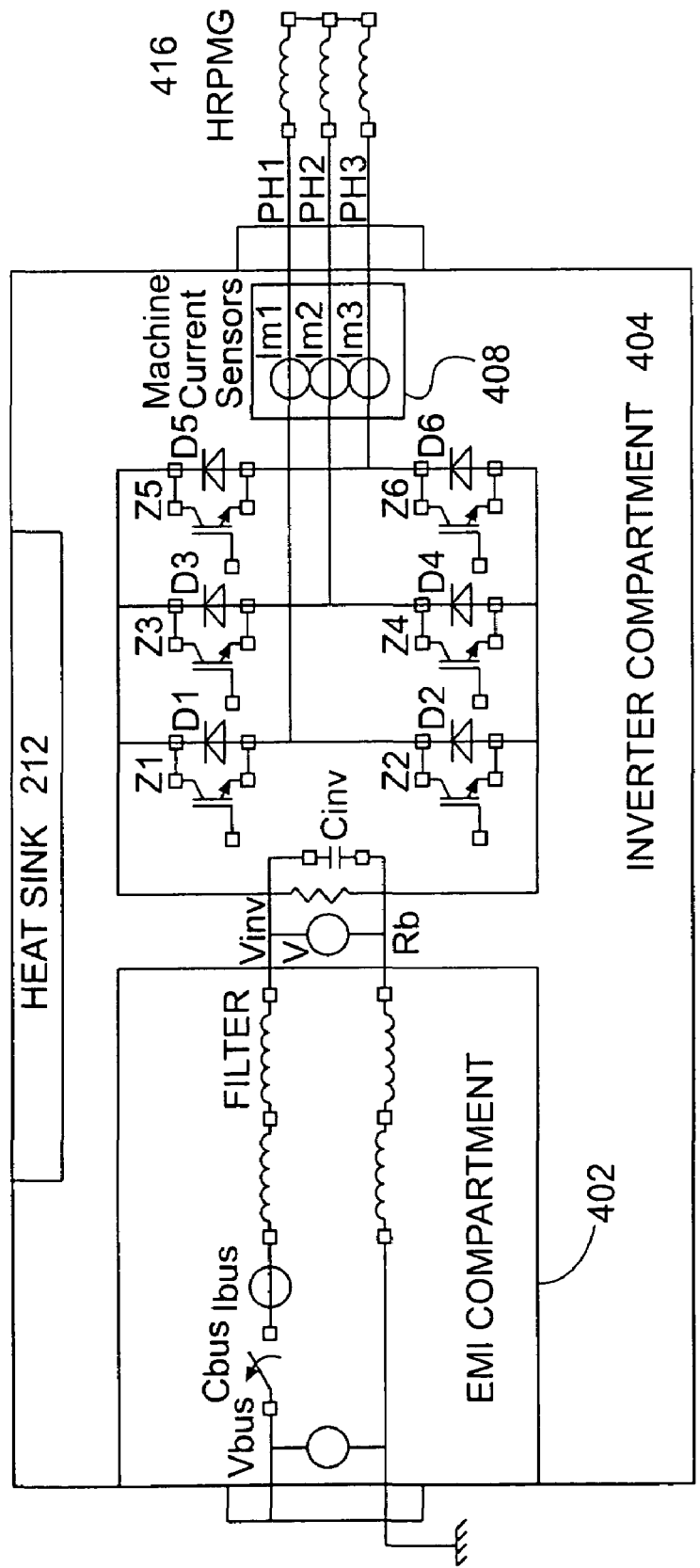
FIG. 5 is a block diagram illustrating an electrical power topology of the EMI filter, the inverter and the current sensors of the power electronics of FIG. 4 according to an embodiment of the invention.

FIG. 5 is a block diagram illustrating an electrical power topology of the EMI filter 402, the inverter 404 and the current sensors 408 of the power electronics 206 of FIG. 4. One skilled in the art will be able to make the electrical power generation system 200 using the electrical schematic shown in FIG. 5.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the present invention is not intended to be limited by the preferred embodiments, but is to be defined by reference to the appended claims.

What is claimed is:

1. A power generation system for mitigating corona discharge, comprising:
   a housing defining a cavity and having an inlet for receiving a fluid that is used to cool and pressurize the cavity and an outlet for removing the fluid from the cavity;
   a rotor having a first end positioned within the cavity of the housing and a second end;
   a plurality of bearings positioned to provide radial support to the rotor;
   a turbine connected to the second end of the rotor;
   a heat sink positioned within the cavity and between the housing and the rotor;
   an electronic component attached to the heat sink; and
   a reaction chamber for receiving the fluid from the outlet and for producing a substance that is directed to the turbine causing it to rotate.

2. The system as defined in claim 1, wherein the fluid is selected from a group consisting of a hydrogen gas, a nitrogen gas, a helium gas, an oxygen gas, an alcohol, a liquid rocket propellant, a liquid hydrogen, a liquid nitrogen, a liquid oxygen and combinations thereof.

3. The system as defined in claim 1, wherein the fluid is introduced into the cavity at a substantially constant rate.

4. The system as defined in claim 1, further comprising a supply conduit for receiving a second fluid and directing the second fluid to the reaction chamber.

5. The system as defined in claim 4, wherein the second fluid is selected from a group consisting of a hydrogen gas, a nitrogen gas, a helium gas, an oxygen gas, an alcohol, a liquid rocket propellant, a liquid hydrogen, a liquid nitrogen, a liquid oxygen and combinations thereof.

6. The system as defined in claim 1, wherein the electrical device is selected from a group consisting of an electromagnetic interference filter, a resistor, an inverter, a gate driver, a sensor, a power supply, a controller and combinations thereof.

7. The system as defined in claim 1, further comprising a thrust disc connected to the first end of the rotor and a plurality of thrust bearings, positioned to contact the thrust disc, for providing axial support to the rotor.

8. The system as defined in claim 7, wherein the plurality of bearings and the plurality of thrust bearings are foil bearings.

9. The system as defined in claim 1, further comprising a stator attached to the heat sink and positioned adjacent to the rotor.

10. An electrical power generation system for mitigating corona discharge, comprising:
- an outer housing defining a chamber and having an input conduit for receiving a fluid that is used to cool and pressurize the chamber and an output conduit for removing the fluid from the chamber;
- a turbine positioned adjacent to the outer housing;
- a rotor positioned within the chamber and connected to the turbine for rotating about a central axis;
- an inner housing positioned within the chamber and between the outer housing and the rotor;
- a plurality of electronic components attached to the inner housing and cooled by the fluid;
- a stator attached to the inner housing and positioned adjacent to the rotor;
- a plurality of bearings, positioned adjacent to the stator, for providing radial support to the rotor and cooled by the fluid; and
- a reaction chamber for receiving the fluid from the output conduit and producing a material that is directed to the turbine causing it to rotate.

11. The system as defined in claim 10, further comprising a supply conduit for receiving a second fluid and directing the second fluid to the reaction chamber.

12. The system as defined in claim 10, wherein the plurality of electrical components are selected from a group consisting of an electromagnetic interference filter, a bleed resistor, an inverter, a gate driver, a sensor, a power supply, a controller and combinations thereof.

13. The system as defined in claim 10, further comprising a thrust disc connected to the rotor and a plurality of thrust bearings, positioned adjacent to the thrust disc, for providing axial support to the rotor.

14. The system as defined in claim 13, wherein the plurality of bearings and the plurality of thrust bearings are self-acting, hydrodynamic foil bearings.

15. A method for mitigating corona discharge, comprising:
- introducing a fluid into a cavity defined by an outer housing, the fluid being used to pressurize the cavity and to cool a rotor, a stator, a plurality of bearings and a plurality of electrical components;
- removing the fluid from the cavity; and
- directing the fluid into a reaction chamber that produces a material used to cause a turbine that is attached to the rotor to rotate.

16. The method as defined in claim 15, wherein the fluid is selected from a group consisting of a hydrogen gas, a nitrogen gas, a helium gas, an oxygen gas, an alcohol, a liquid rocket propellant, a liquid hydrogen, a liquid nitrogen, a liquid oxygen and combinations thereof.

17. The method as defined in claim 15, further comprising introducing a second fluid into the reaction chamber to be combined with the fluid.

18. The method as defined in claim 17, wherein the second fluid is selected from a group consisting of a hydrogen gas, a nitrogen gas, a helium gas, an oxygen gas, an alcohol, a liquid rocket propellant, a liquid hydrogen, a liquid nitrogen, a liquid oxygen and combinations thereof.

19. The method as defined in claim 15, further comprising directing the fluid to a heat sink to cool the heat sink, wherein the stator and the plurality of electrical components are attached to the heat sink.

20. The method as defined in claim 15, wherein the plurality of electronic components are selected from a group consisting of an electromagnetic interference filter, a bleed resistor, an inverter, a gate driver, a sensor, a power supply, a controller and combinations thereof.

* * * * *